(No Model.)
W. T. HENRY.
Machine for Inserting Rubber in the Peripheries of Drive-Wheels.
No. 227,106.                  Patented May 4, 1880.
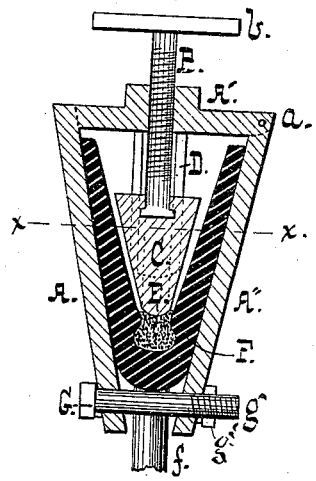
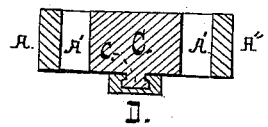
Witnesses,
W. A. Bertram
&L. H Barclay.
Inventor,
W_T_HENRY_
by
R. D. Williams.
Attorney.

UNITED STATES PATENT OFFICE.

WILLIAM T. HENRY, OF BALTIMORE, MARYLAND.

MACHINE FOR INSERTING RUBBER IN THE PERIPHERIES OF DRIVE-WHEELS.

SPECIFICATION forming part of Letters Patent No. 227,106, dated May 4, 1880.

Application filed March 24, 1880. (No model.)

*To all whom it may concern:*

Be it known that I, WM. T. HENRY, of Baltimore city, State of Maryland, have invented certain new and useful Improvements in Machines for Inserting Rubber in the Peripheries of Drive-Wheels; and I hereby declare the same to be fully, clearly, and exactly described as follows, reference being had to the accompanying drawings, in which—

Figure 1 is a central sectional view of the device, and Fig. 2 a sectional view on the line $x\ x$, Fig. 1.

My invention has for its object to provide a device whereby the sections of rubber used upon the peripheries of drive-wheels for wire rope may readily be renewed when worn out.

Wheels of this class are shaped somewhat like an ordinary sheave, having a deep groove in the periphery, which groove has at its bottom a recess dovetail in cross-section, in which latter the sections of rubber are inserted and held by the shape of the recess.

Great difficulty has heretofore attended the renewal of the worn-out sections of rubber and the insertion of new pieces, by reason of the tendency of the same to spring out of place or turn over in being forced into the groove.

My invention obviates this difficulty by providing a device whereby the thrust upon the rubber is maintained truly in the radius of the wheel.

In the accompanying drawings, A' is a cross-piece having arms A A'', the latter being pivoted or hinged at $a$. A bolt, G, passes through holes in the ends of the arms and carries a nut on its threaded end $g$. From the cross-piece A' depends or projects a bar, D, in the axis of the device, or parallel thereto, on which slides a triangular or wedge-shaped block, C, having a dovetail rib, $c$, which engages with a similarly-formed slot in the bar D. This block is driven toward the bolt G by means of a screw, B, carrying a lever or hand-wheel, $b$, and passing through the cross-piece A'.

F is the wheel-rim, and E the section of rubber, $f$ representing one of the arms or spokes of the wheel.

In operation, the nut $g'$ being removed, the arm A'' is swung back and the device is made to clasp the periphery of the wheel, as shown, the arms A A'' being secured around it by the bolt G and nut $g'$. The sections of rubber are then placed over the recess and driven home by means of the block C, screw B, and lever $b$. The device may thus be carried completely around the wheel, it being only necessary to remove the bolt G in order to pass the spokes.

What I claim is—

1. In a device for inserting rubber in the peripheries of wheels, a clamp, arranged as described, to embrace the wheel-rim, and provided with a presser-block and mechanism for driving the same in the plane of the wheel, as set forth.

2. The V-shaped clamp, whose arms are separable at the apex, as set forth, and provided with the axially-sliding block and screw, as and for the purpose described.

3. The combination, substantially as set forth, of the arms A A'', cross-bar A', bolt G, block C, and screw B, as set forth.

WM. T. HENRY.

Witnesses:
R. D. WILLIAMS,
JOHN C. GITTINGER.